United States Patent [19]
Wolff

[11] Patent Number: 5,233,801
[45] Date of Patent: Aug. 10, 1993

[54] METHOD OF ERECTING THE OUTER WALLS OF A BUILDING, AND A BUILDING

[76] Inventor: Ib V. Wolff, Strandvejen 336, DK-2930 Klampenborg, Denmark

[21] Appl. No.: 743,333
[22] PCT Filed: Jan. 31, 1990
[86] PCT No.: PCT/DK90/00028
    § 371 Date: Aug. 8, 1991
    § 102(e) Date: Aug. 8, 1991
[87] PCT Pub. No.: WO90/08862
    PCT Pub. Date: Aug. 9, 1990

[30] Foreign Application Priority Data
    Feb. 1, 1989 [DK] Denmark .............................. 0446/89

[51] Int. Cl.$^5$ ................................................. E02D 5/04
[52] U.S. Cl. ............................... 52/169.11; 52/169.14; 52/274; 405/229
[58] Field of Search .................. 52/169.4, 169.14, 274, 52/169.1; 405/131, 229

[56] References Cited

U.S. PATENT DOCUMENTS

| | | |
|---|---|---|
| 3,557,502 | 1/1971 | Krebs . |
| 3,561,175 | 2/1971 | Best et al. . |
| 3,820,295 | 6/1974 | Folley ................................... 52/270 |
| 4,263,762 | 4/1981 | Reed ..................................... 52/293 |
| 4,409,766 | 10/1983 | Blackmore ....................... 52/169.11 |
| 4,433,720 | 2/1984 | Lowstuter . |

FOREIGN PATENT DOCUMENTS 3600230  12/1987  Fed. Rep. of Germany .

*Primary Examiner*—Carl D. Friedman
*Assistant Examiner*—Matthew E. Leno
*Attorney, Agent, or Firm*—Davis Hoxie Faithfull & Hapgood

[57] ABSTRACT

A building (1) where steel plates (2, 8, 9) are used partly as heat transporting elements to and from the constant heat area of the earth which is at a constant temperature and partly as load-bearing elements. The steel plates (2, 8, 9) maintain a significantly higher surface temperature than the outer walls of a conventional building in the winter, and they are insulated (5) on the inner side to below ground level with a high insulation value, thereby making it possible to maintain stay temperature in the interior of the building because of the free heat from the interior of the building and activities of a few individuals as well as from incident sunlight and heat from domestic appliances, light, radio, etc. In the summer, the steel plates serve as air condition by conducting excess heat down into the ground. They may be insulated (10) on the outer side to restrict heating owing to incident sunlight. This insulation (10) also reduces the need for thermal energy from the earth magazine in the winter.

14 Claims, 2 Drawing Sheets

METHOD OF ERECTING THE OUTER WALLS OF A BUILDING, AND A BUILDING

The invention concerns a building and a method for erecting a building.

The object of the invention is to provide a method of erecting the outer walls of a building so that with a minimum consumption of energy—corresponding to the free heat from a few individuals, use of refrigerators, freezers, TV and consumption of electricity for lighting purposes—a stay temperature is maintained inside the building, both when the ambient temperature is low like in the winter, and when it is high like in the summer.

The term stay temperature is taken to mean room temperature, about 20° C., in case of dwellings, and of course other temperatures in case of buildings for domestic animals or cold stores.

The stated object is obtained according to the invention in that the method stated in the opening paragraph is characterized by the features defined in the claims.

As stated, the load-bearing steel plates of the building extend a distance down into the constant heat area of the earth. "Constant heat area" refers to the portion of the earth which remains at a constant temperature. For the Danish climate, this means that the steel plates extend 1-1.5 m down into the ground, while, if the building is to be erected e.g. at Thule, they are to extend considerably further down.

The steel plates, which may form the load-bearing structure of the building instead of traditional structures of e.g. bricks and concrete, serve as heat conductors to and from the constant heat area lying below the building. The plates have an upper portion which is above ground level and a lower portion which is below ground level.

In the summer the heat passes through the steel down into the earth in a depth with a prevailing temperature of +8° C. and is stored there. This results in a very significant increase in the temperature in the constant heat area.

In the winter, where we need supply of heat, the heat goes the other way up through the steel plates, from the earth and upwardly toward the roof. An average temperature for the year is maintained in this manner in the steel plates.

It is thus clear that there is a very great temperature difference between the surface temperature in the outer walls of traditional buildings and the surface temperature in the steel plates on a cold winter day.

In case of a temperature in a winter night of e.g. −4° C. in the surface of an outer wall and thus a temperature difference of 24° C. to a stay temperature of 20° C., and the stated temperature of −4° C. is compared with the +8° C. of the steel plate originating from the heat in the constant heat area, the steel plate entails that the temperature difference will only be 12° C., and it is this feature which entails that energy consumption for heating is avoided.

From this starting point, the +8° C. of the steel plate, the building is insulated to the desired stay temperature of e.g. 20° C. inside the building, this temperature being maintained by the free heat (the amount of heat liberated by the inhabitants together with domestic appliances, light, radio, TV, etc.). Thus, it does not matter whether the building is erected in the northern part of Norway or in Sahara, the thickness of insulation being merely regulated. In Denmark, a thickness of insulation corresponding to about 40 cm mineral wool thickness will be suitable for maintaining a desired temperature. This insulation thickness will thus maintain the 20° C. because of the free heat liberated inside the building, and because the steel plates, as mentioned, are kept at +8° C. by means of the heat from the constant heat area, even though the ambient temperature is −4° C.

In case of a severe winter which does not follow a warm summer, there will be a heat energy supply deficiency at the end of the winter. The heat of the earth, which is +8° C. in Denmark, as mentioned, is used for balancing this heat deficiency. In case of an extended cold period of −10° C. in a very severe winter calculations show that the temperature of the steel plates can be lowered to +2.8° C., e.g. still above zero, whereas in case of traditional buildings the −10° C. would have penetrated far into the outer walls.

In case of high summer temperatures with great incident sunlight the steel plates, as mentioned, conduct the heat down into the earth and thereby contribute to keeping down the temperature in the interior of the building. The structure thus acts as air condition.

The steel plates do not have a great effect at mean temperatures, but the effects occur at the high and the low temperatures, the latter being of great importance in Denmark in the winter.

Additional advantages are obtained according to the invention because the load-bearing structure of the building is steel plates in contrast to the traditional building materials. This results in a great reduction in the costs of erecting the building. To this should be added that initial expenditure on furnace installations, radiators, pumps and equipment is saved. Further, the annual heating expenditure on oil, gas or electricity is saved. In this connection, however, the most important aspect is that the invention provides for complete elimination of air pollution from the buildings.

A supplementary advantage of this steel structure is that it is more stable than buildings without steel walls providing proof against collapse, which is important in the earthquake regions. Buildings, where the length, i.e. the diagonal, does not exceed 30 m, do not collapse in case of earthquakes, because the steel plates react in unison.

As stated in claim 22 and in claim 23, the metal plates may be supplemented from a distance above ground level to a distance below ground level so as to achieve a better heat transport to and from the earth. These additional metal plates may optionally be bent slightly from the load-bearing metal plate in the ground, so that they obtain contact with or thermal coupling to other parts of the earth, which is a poor heat conductor. Alternatively, the metal plate 2 may be thicker near ground level, as shown in FIG. 2.

The insulation layer mentioned in claim 14 can contribute to increasing the temperature in the constant heat area, and this also reduces the transmission loss through the floor in the winter. The insulation layer suitably has an extent of 1.5 m and extends in practice obliquely downwardly from the building owing to the rainwater.

As stated in claim 15, it may be expedient to insulate the building on the exterior of the metal plates above ground level. This may contribute to reducing the temperature of the metal plate on very hot days, so that the temperature inside the building does not get too high, and so that the plates do not expand because of direct incident sunlight. Further, this also reduces the need for thermal energy from the constant heat area to keep the correct temperature in the steel plates in the winter.

The invention also concerns a building. This building is characterized by the features defined in claim 1 and by the additional characteristics stated in claims 19, 20, 24 and 25.

The invention will be explained more fully below with reference to the drawings, each showing a vertical section through part of a building according to the invention.

Figure 1:
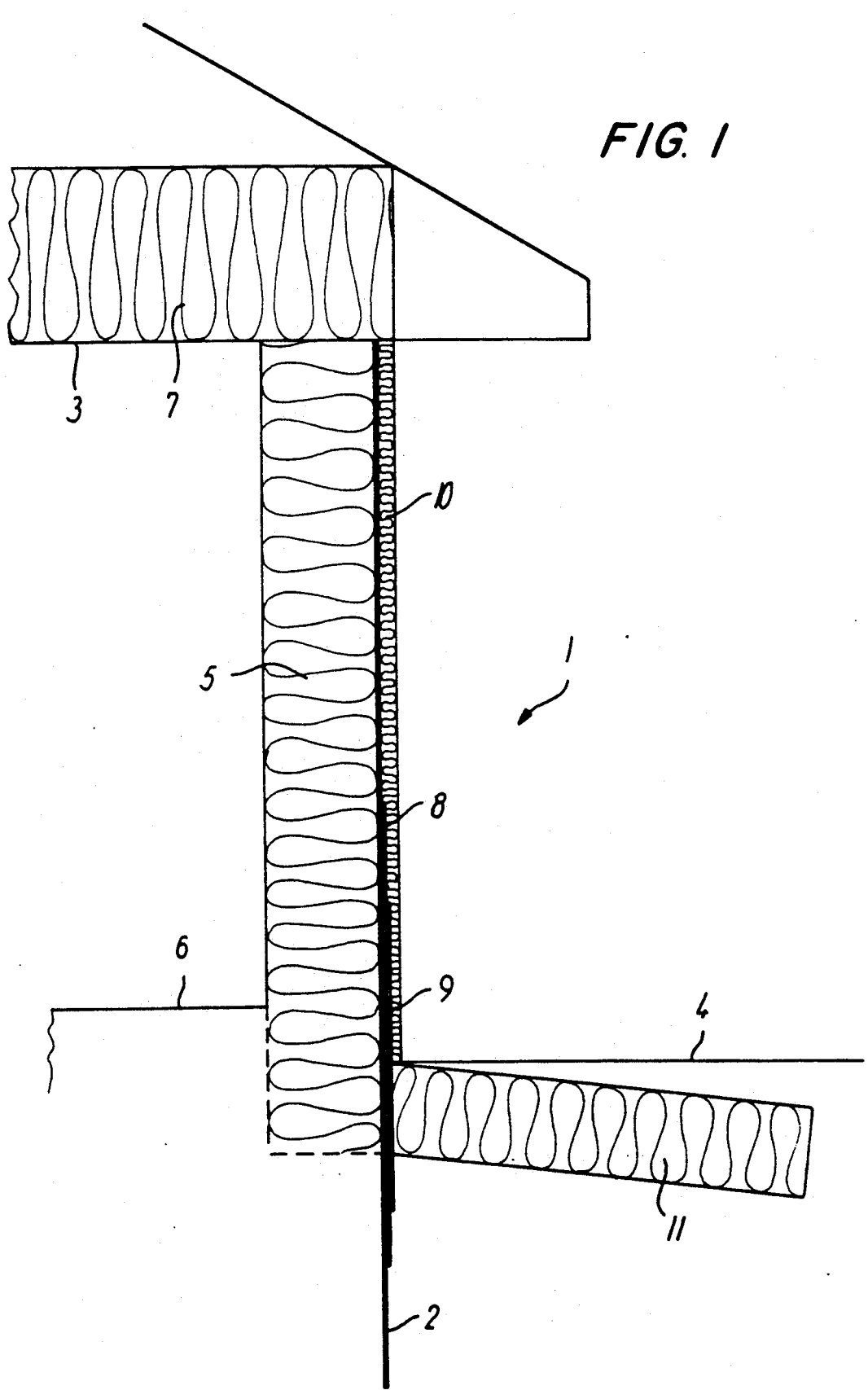
FIG. 1 is a cross-sectional view of a wall of a building constructed in accord with the present invention having multiple plates near ground level.
Figure 2:
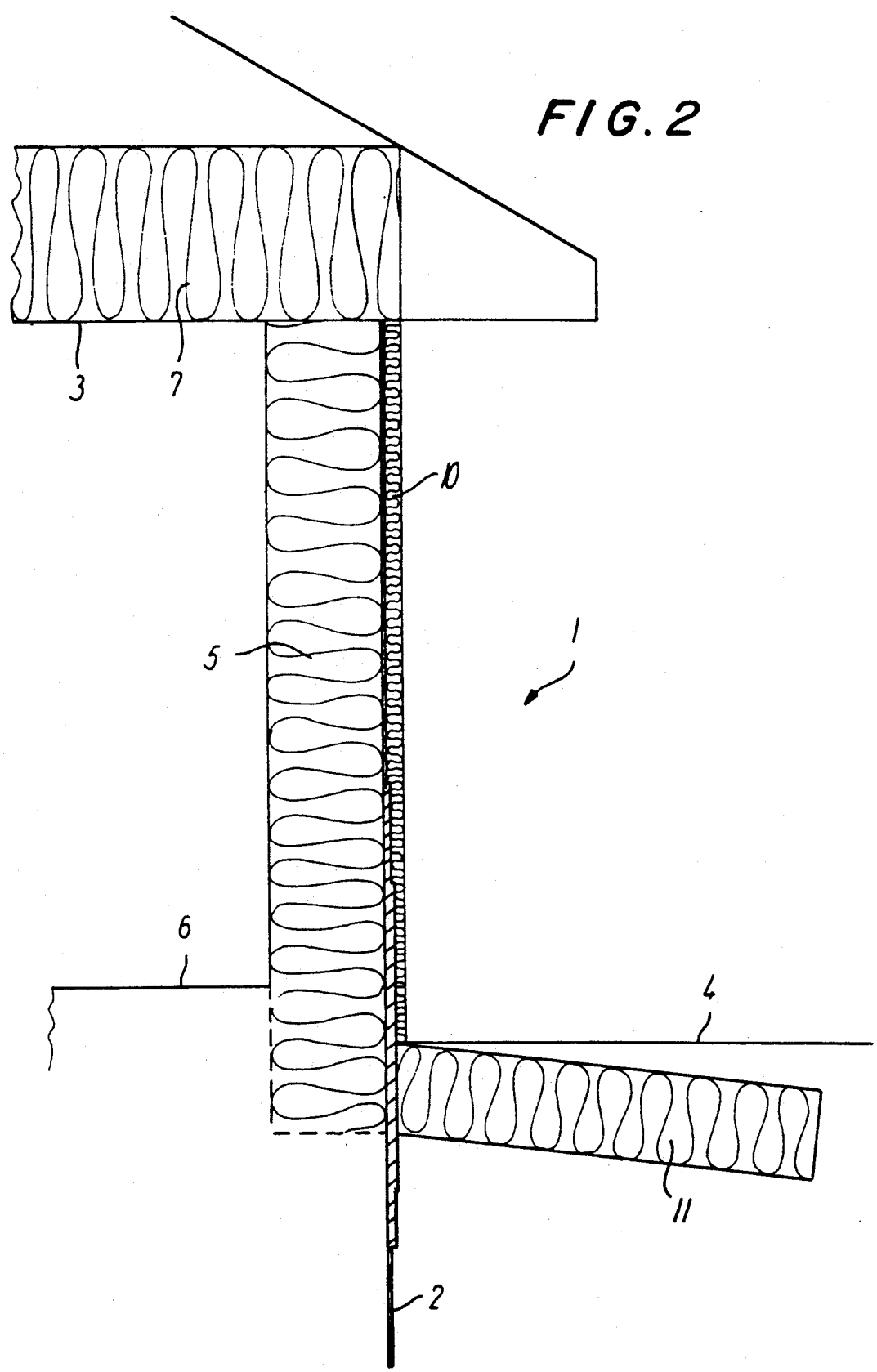
FIG. 2 is a cross-sectional view of a wall of a building constructed in accord with the present invention having a plate thicker near ground level.

The building 1 shown in the drawing consists of a load-bearing structure of steel plates 2, which are 12 mm thick in the chosen example. The steel plates 2 extend from the ceiling 3 of the building and are dug or pressed about 1–1.5 m down below the surface of the ground 4.

The steel plates have a suitable width and are interconnected with vertical sealing joints so that they cannot expand or contract in case of changes in temperature. Of course, openings are cut in the steel plates for windows and doors.

On the inner side of the steel plates 2 there is attached an insulation 5 with an insulation value as desired, optionally corresponding to 40 cm mineral wool, which extends a distance below a floor 6, said distance suitably corresponding to the thickness of the insulation (not shown) below the floor 6.

An insulation layer 7 of a suitable thickness, here 60 cm, is provided on top of the ceiling 3.

An additional steel plate 8 with a thickness of 6 mm is attached exteriorly to the steel plate 2. The steel plate 8 extends upwards such that the top half of the plate reaches midway between the ceiling 3 and ground level, in this case 1.15 m, and the other half of the plate is below ground level.

A further steel plate 9 with a thickness of 6 mm is attached exteriorly to the steel plate 8. The steel plate 9 extends above ground level about one-quarter of the distance from the ground level toward the ceiling 3, in this case 55 cm, to just as much below ground level.

An insulation layer 10, which corresponds to 40 mm mineral wool thickness in the shown example, is attached to the outer side of the steel plates 2, 8 and 9.

An insulation layer 11, corresponding to e.g. 30 cm mineral wool thickness is dug into the ground. The insulation layer 11 extends from the area where the steel plates 2, 8 and 9 of the building 1 go down into the ground. The insulation layer 11 has an extent of about 1.5 m away from the building and extends obliquely downwardly owing to rainwater.

An angle-iron foundation (not shown) may be buried in the ground below the upper edge of the steel plates 2. The lower edges of the steel plates 2 may be supported in this foundation in the right angle of the angle irons so that the building does not sink.

To protect the steel structure against corrosion, cathodic protection is used.

The invention may also be utilized in connection with existing buildings, it being possible to cover the exterior of the existing building with metal plates extending a distance down into the constant heat area of the earth. The existing building then fully or partially constitute the insulation of the metal plates on the inner sides. Of course, openings are cut in the metal plates in alignment with windows and doors in the existing building, if the windows and the doors are to be maintained. Further, the metal plates mounted on the building may be insulated on the outer side above ground level if desired.

I claim:

1. A building having outer walls which comprise metal plates having an inner side and an outer side with an upper portion above ground and a lower portion below ground which plates extend a distance down into the constant heat area of the earth, and which plates are insulated on the entire inner side on the upper portion, extending to the lower portion slightly below ground level with a high insulation value.

2. A building according to claim 1 wherein an insulation layer is present in the ground, the insulation layer extending from the area where the metal plates from the building go down into the ground, and extending away from the building.

3. A building according to claim 2 wherein the building is insulated on the outer side of the metal plates above ground level.

4. The building of claim 1 wherein the metal plates are thicker or are supplemented by additional plates mounted on the metal plates, said additional plate or thickness extending a first distance on the upper portion from ground level to a point halfway between the ceiling and ground level and extending a second distance downwardly on the lower portion from ground level, wherein the first distance is the same length as the second distance.

5. The building of claim 1 wherein the metal plates are thicker or are supplemented by additional plates mounted on the metal plates, said additional plates or thickness extending a first distance on the upper portion from ground level to a point a quarter of the way between the ceiling and ground level and extending a second distance downwardly on the lower portion from ground level wherein the first distance is the same length as the second distance.

6. A method of erecting a building with a ceiling so that the stay temperature inside the building is maintained with a minimum energy consumption, both when the ambient temperature is low and when it is high, comprising the steps of:

forming outer walls of the building from metal plates having an upper portion and a lower portion, each plate having an inner face and an outer face;

erecting the metal plates such that the plates are load bearing structure for the building and such that the upper portion is above ground level and the lower portion is below ground level, wherein the lower portion extends down to the constant heat area of the earth; and insulating the plates over the entire inner face and extending to a point on the lower portion with a high insulation value.

7. The method of claim 6 wherein the metal plates are thicker or are supplemented by additional plates mounted on the metal plates, said additional plate or thickness extending a first distance on the upper portion from ground level to a point halfway between the ceiling and ground level and extending a second distance downwardly on the lower portion from ground level, wherein the first distance is the same length as the second distance.

8. The method of claim 6 wherein the metal plates are thicker or are supplemented by additional plates mounted on the metal plates, said additional plate or thickness extending a first distance on the upper portion from ground level to a point a quarter of the way between the ceiling and ground level and extending a second distance downwardly on the lower portion from ground level, wherein the first distance is the same length as the second distance.

9. A method according to any one of claims 6, 7, or 8 further comprising the step of placing an insulation layer into the ground, extending from the area where the metal plates of the building go down into the earth and extending away from the building to a point away from the building.

10. A method according to claim 9 wherein the building is insulated on the outer face of the metal plates above ground level.

11. A building erected so that the stay temperature inside the building is maintained with a minimum energy consumption, both when the ambient temperature is low and when it is high comprising outer walls made of at least a first plate and a second plate such that the plates are load bearing structure wherein at least the first plate extends down into a constant heat area of the earth, and insulation mounted interiorly on the first plate, completely covering said first plate and extending to a position at least slightly below ground level.

12. The building of claim 11 wherein the second plate is mounted to the first plate from a point above ground level to a point below ground level.

13. The building of claim 11 further comprising an insulation layer extending from the metal plates at ground level away from the building.

14. The building of claim 11 wherein the building is insulated exteriorly on the metal plates above ground level.

* * * * *